United States Patent Office 3,234,152
Patented Feb. 8, 1966

3,234,152
MIXED FAST AND SLOW COCATALYSTS FOR POLYMERIZING AND FOAMING CAPROLACTAM
Mack F. Fuller, Woodbury, N.J., assignor to E. I. du Pont de Nemours and Company, Wilmington, Del., a corporation of Delaware
No Drawing. Filed Apr. 4, 1963, Ser. No. 270,524
13 Claims. (Cl. 260—2.5)

The present invention relates to a process for the manufacture of foamed polycaprolactam articles.

The rapid polymerization of ε-caprolactam has attracted attention within the recent past because plastic articles can rapidly be made thereby without the necessity of using injection molding techniques on previously prepared polycaprolactam at temperatures above the melting point of the polycaprolactam. Using rapid polymerization techniques articles of any size can be formed by injecting a mixture of ε-caprolactam, a catalyst and a cocatalyst into a mold and heating below the melting point of polycaprolactam until polymerization takes place. Alkaline materials are used as catalysts during this process along with materials such as isocyanates or other acylating agents as cocatalysts.

The rapid polymerization technique is uniquely suited for making objects of expanded or foamed polycaprolactam. Foaming polycaprolactam is diffcult because the polymer must be heated until soft before expansion can be accomplished. This requires high temperatures and blowing agents usable at such high temperatures are not easily available. "Blowing agents" as used herein refers to unstable compounds which decompose when heated to give off a gas, usually nitrogen which is dispersed into the polymer to lower its density. In the rapid polymerization technique blowing temperatures can be much lower because the melting point of the polymer is not reached.

Procedures are known for preparing foamed, cast articles of polycaprolactam which involve polymerizing ε-caprolactam in the presence of a basic catalyst, a cocatalyst, and a blowing agent. In the past these procedures have been somewhat unsatisfactory because of the necessity for precise synchronization of the rate of polymerization with the rate of gas generation in order to obtain products having high quality and efficiency of gas utilization in the final product. In addition, cocatalysts satisfactory in one system may be wholly unsatisfactory in another system. For example, when fillers such as carbon black or calcium carbonate are added to a system, they generally carry traces of polymerization poisons and thus retard polymerization and lead to premature blowing. Surprisingly, a mere increase in the quantity of cocatalyst used does not overcome the action of these traces of poisons and give satisfactory products. In another case, when very fast cocatalysts are used and the mix polymerizes before sufficient gas has been given off by the gas-generating compound, the remedy of decreasing the quantity of fast cocatalyst does not result in satisfactory foamed articles.

The present invention provides an improvement in the process for making foamed caprolactam which eliminates the aforementioned problems. More particularly, the process of this invention is an improvement in the process for making foamed caprolactam by heating a mixture of ε-caprolactam and an allylic azide blowing agent in the presence of a lactam-base salt and a cocatalyst, which improvement comprises using a cocatalyst mixture of (a) at least one of the group consisting of 1,1,3,3-tetramethylcyclobutanedione and 2,2,4-trimethyl-3-hydroxy-3-pentenoic acid β-lactone, and (b) a fast cocatalyst having a no-flow time of less than about 1.5 minutes determined as described hereinafter in the passage immediately preceding Example 1.

Foamed articles cast by the process of the present invention also have the advantages that, as compared with foamed articles obtained by prior art teachings, the surface quality of the polymer articles is better, the density of the foamed articles is as good or better, and there is less waste because of edge irregularities.

The polymerization process of this invention is particularly effective in producing rapidly high molecular weight foamed polyamide articles from ε-caprolactam. Generally, the anionic polymerization process can be started at temperatures above the melting point of the ε-caprolactam but below the melting point of the resulting polycaprolactam. In general, this starting temperature range is from about 130° C. to about 200° C. ε-Caprolactam is readily polymerized by the process of this invention starting at temperatures between 140° C. and 160° C. with 150° C. being a convenient starting temperature. During the polymerization the reaction mixture is held at least at a temperature of 130° C. but below the melting point of the polycaprolactam.

The lactam-base salts used as base catalysts in the process of this invention are prepared by the reaction of bases with a lactam. Generally, the ε-caprolactam is used for the preparation of such anionic catalysts; but if desired, such anionic catalysts can be prepared from another lactam.

The base employed to form the anionic catalyst can be an alkali metal, an alkaline earth metal, or a basic derivative of one of these metals such as hydroxide, alkoxide, hydride, alkyl, aryl, amide, or organic acid salt. All of these bases are of the type which are strong enough to convert the lactam to its iminium salt. Thus, sodium hydroxide, potassium hydroxide, lithium hydroxide, magnesium hydroxide, calcium hydroxide, strontium hydroxide, lithium hydride, sodium hydride, sodium methoxide, sodium methyl, sodium ethyl, sodium phenyl, sodium naphthyl, sodamide, and the like are suitable bases for the preparation of the anionic catalyst. The preferred base for use in the present invention, however, is sodium hydride because of the ease of removal of the hydrogen which is the other product formed when sodium hydride reacts with the lactam to form the sodium-lactam salt. The sodium hydride, for convenience in handling, can be used as a dispersion in oil or liquid hydrocarbons, aromatic, aliphatic or cycloaliphatic. A particularly effective diluent for the sodium hydride is a partially hydrogenated terphenyl available under the name of HB-40.

The anionic catalyst, that is, the lactam-base salt, is prepared by heating the lactam with a base at a temperature between about 25 and 225° C. The base can be added to the total lactam which is to be polymerized or to a portion of the lactam which is to be polymerized and this portion of the resultant lactam containing the anionic catalyst added to more of the lactam later. If the portion of caprolactam containing the anionic catalyst is held for long periods before use, it should be kept below 125° C. to prevent premature polymerization. The time required for this step in the process depends upon the strength of the base employed, the proportion added, and the temperature chosen and can be from a few seconds to several hours. Preferably, the lactam should be essentially anhydrous as should the added base. Generally, the amount of the base charged should be between about 0.5 mole percent and about 5.0 mole percent of the total caprolactam used. The preferred range is between about 0.7 mole percent and about 1.5 mole percent.

In general, any cocatalyst having a no-flow time of less than about 1.5 minutes determined as described hereinafter can be used as the fast cocatalyst in the process of this invention. Preferred cocatalysts are those having a no-flow time of less than about 1.5 minutes and selected from the group consisting of acyl lactams bearing at least two lactam rings, preferably acyl bislactams; compounds of the formula

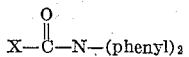

wherein X is a heterocyclic ring, and preferably a five-membered heterocyclic ring having two conjugated double bonds and at least two ring nitrogen atoms, one of which is bonded to the

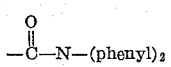

organic carbonates having at least one carbocyclic aromatic group bonded through aromatic carbon to an oxygen of a carbonate group, particularly those containing two carbocyclic aromatic groups each bonded through aromatic carbon to one oxygen of one carbonate group and those comprising polymers having the repeating structural unit

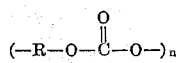

wherein $n$ is about from 10 to 320 and R is a carbocyclic aromatic group bonded through aromatic carbon to the indicated carbonate group; polymers having the repeating structural unit $-(CF_2S)-$, particularly those of the formula $-(CF_2S)_x-$ wherein $x$ is about from 3000 to 6000; and mixtures thereof.

The aforementioned acyl lactams include, for example, the addition products of lactams, preferably of 3 to 11 carbon atoms, with aliphatic, aromatic and cycloaliphatic isocyanates, particularly aliphatic and aromatic diisocynates, as well as acyl lactams formed from corresponding acyl chlorides, acyl anhydrides or ketenes. The preparation and structure of the aforementioned acyl lactams is illustrated by the following equation for the addition of lactams and diisocyanates:

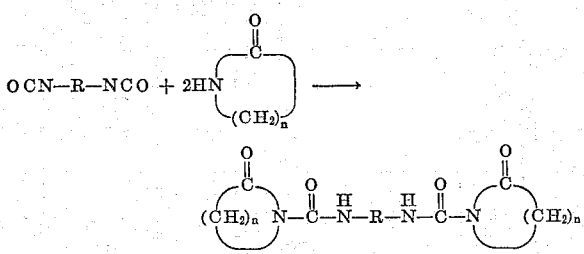

wherein $n$ is 3 to 11 and preferably 5, and R is an aromatic, aliphatic or cycloaliphatic radical preferably up to 20 carbon atoms. If the isocyanate contains more than two —NCO groups, the number of moles of lactam employed for the adduct is equal to the number of isocyanate groups in the isocyanate. The reaction of acyl chlorides, acyl anhydrides and ketenes with lactams yields similar products excepting that R is bonded directly to the carbonyl groups or, for example, where oxalyl chloride is employed, the carbonyl groups are bonded directly. More detailed descriptions of diphenylcarbamyl heterocyclic cocatalysts, aromatic carbonate cocatalysts and polymeric —(CF₂S)— cocatalysts useful in this invention and their method of preparation are given, respectively, in copending applications Serial No. 211,898, filed June 23, 1962, now abandoned; 242,895, filed December 7, 1962 and 138,301, filed September 15, 1961, now Patent No. 3,138,- 575. Examples of fast cocatalysts which can be used in the process of this invention are:

2/1 adduct of ε-caprolactam and 2,4-toluenediisocyanate
2/1 adduct of ε-caprolactam and hexamethylenediisocyanate
2/1 adduct of ε-caprolactam and 4,4′-methylenebis-(phenyl isocyanate)
3/1 adduct of ε-caprolactam and 1,4-xylene-2,4,6-triisocyanate
N,N′-carbonyl-biscaprolactam
N,N′-oxalylbiscaprolactam
N,N′-sebacoylbiscaprolactam
N,N′-azeloylbiscaprolactam
1-diphenylcarbamylimidazole
1-diphenylcarbamylpyrazole
1-diphenylcarbamyl-1,2,4-triazole
1-diphenylcarbamylbenzimidazole
1-diphenylcarbamylbenzo-1,2,3-triazole
Diphenyl carbonate
Poly[2,2,-propanebis(4-phenyl carbonate)]
Diethyleneglycolbis(phenyl carbonate)
Polymers of the formula $-(CF_2S)_x-$ where $x$ is 3000 to 6000

The first cocatalyst component, i.e., 1,1,3,3-tetramethylcyclobutanedione, 2,2,4 - trimethyl-3-hydroxy-3-pentenoic acid β-lactone or mixtures thereof is employed in proportions varying from about 0.2 mole percent to about 0.5 mole percent of the total caprolactam used. The preferred range is from about 0.25 mole percent to about 0.4 mole percent. The fast cocatalysts, e.g., the acyl lactams, diphenylcarbamyl heterocyclic compounds, the aromatic carbonates, the polymers $-(CF_2S)_x-$, or mixtures thereof, are used in proportions varying from about 0.05 mole percent to 0.02 mole percent based on the total caprolactam used. The preferred range is from about 0.1 mole percent to about 0.15 mole percent. In calculating the mole percentage of polymeric cocatalysts such as the $-(CF_2S)_x-$ polymers, the mole percent of the recurring mer units, for example, $-CF_2S-$, is used.

The allylic azide blowing agents employed in the process of this invention are compounds having an azido methyl group bonded to an unsaturated carbon atom. These azides as well as their method of preparation are described more fully in copending application Serial No. 171,356, filed February 6, 1962. Aliphatic azides of 8 to 24 carbon atoms and benzyl azides, especially alkyl substituted benzyl azides of 8 to 18 carbon atoms, are preferred. Examples of the aforementioned azides are dodecenyl azide (i.e., 1-azido-5,5,7,7-tetramethyloctene-2); 1,3-dimethylbenzyl azide; 1,4-bis(azidomethyl)durene; p-phenoxybenzyl azide; monoazidomethyldurene; dodecylbenzyl azide; 2,4,5-trimethylbenzyl azide; 3-azido-1-heptene; benzyl azide; methoxybenzyl azides; and mixtures thereof. 1 - azido-5,5,7,7 - tetramethyloctene-2; 1,4-bis-(azidomethyl)durene; p-phenoxybenzyl azide and monoazidomethyl durene are particularly preferred because of their optimum foaming and processing properties in accordance with this invention.

The allylic azides are used in proportions varying from about 0.1 part per 100 parts of caprolactam to about 2 parts per 100 parts of caprolactam depending on the density desired. The preferred range is between about 0.1 part/100 parts caprolactam to about 1.4 parts/100 parts of caprolactam.

The allylic azides are generally added just before initiating polymerization. They should not be exposed to high temperatures in the presence of basic catalysts for extended periods because they lose gas. The allylic azide can be, for example, added to a portion of molten caprolactam containing the cocatalyst mixture just before combination of this portion with the portion containing anionic catalyst or the two portions can be mixed and then the allylic azide added quickly. The cocatalyst mixture can be added to the lactam containing the anionic catalyst, or equally well, as just indicated, the cocatalyst can be dissolved in a separate portion of the lactam and the two portions of lactam mixed at the time the polymerization is desired. For optimum operation of the process of this invention an inert gas such as nitrogen is bubbled through the molten lactam during the initial reaction with base to form the anionic catalyst in order to remove any low molecular weight compound formed such as water and in order to prevent oxidation. Alternatively, this reaction of the lactam with base can be carried out under reduced pressure in which case the low molecular weight compound is distilled from the lactam.

The process of this invention is useful in rapidly preparing cast articles of any size and shape from lactams. The process can be employed to obtain unusual shapes which would be difficult, if not impossible, to obtain by conventional molding of prepolymerized polyamides. The process has the advantage when used in this fashion that high temperatures and high pressures normally required in injection molding and similar processes are not necessary. Therefore, simpler lighter weight molds can be employed and faster cycles often can be obtained in the preparation of large, shaped articles. The entire process can be carried out in the mold or, if desired, the lactam solution containing the anionic catalyst and a second portion of the lactam solution containing the cocatalyst and allylic azide can be mixed and then immediately cast into the mold by procedures similar to transfer molding to obtain the desired shaped article in any size at a very high rate. Similarly, it is possible to employ the process of this invention in many extrusion-type operations, in which the lactam containing the anionic catalyst and another portion of the lactam containing the cocatalyst and allylic azide are intimately mixed and then extruded under conditions which provide for obtaining an extrudate which is polymerized as it is formed.

The process of this invention is operable in the presence of various fillers, reinforcing agents, antioxidants, plasticizers, other resins (e.g., styrene, acrylic, nylon, polyester), colorants, and the like. The process of this invention contemplates the use of the process under all of the above conditions.

The invention is more thoroughly illustrated by the following examples in which parts and percentages are by weight unless otherwise indicated.

*Examples*

The procedure for determining the speed of a cocatalyst is as follows:

$\epsilon$-Caprolactam (40 g.) is heated to 80° C. and 0.255 g. of NaH/white mineral oil (50/50 by weight) is added. The lactam is sparged with nitrogen at a flow rate of 750 ml./min. and heated to 150° C. The cocatalyst (0.3 mole percent based on lactam) is added and nitrogen sparging continued for 15 sec. then stopped. The time is measured from the addition of the cocatalyst until the viscosity of the mix increases to the point where it would no longer flow when the reaction vessel is tilted at 45° to the horizontal. This time is called the "no-flow time." A cocatalyst having a "no-flow time" of less than about 1.5 minutes is defined as a fast cocatalyst.

*Example 1*

This example shows the improved results obtained by using a cocatalyst mixture of this invention in the anionic polymerization of caprolactam rather than either component of the mixture above.

A. A portion of dry caprolactam (80 parts) is mixed with 1.02 parts of NaH/oil (50/50 by weight) at 80° C. The tube is sparged with dry nitrogen and heated to 150° C. Potassium stearate (4.8 parts) is then added and mixed well.

To a second portion of dry caprolactam (80 parts) is added 80 parts of precipitated $CaCO_3$ (average particle size 10 microns, 8% particles less than 5 micron, 4% of particles greater than 25 microns, maximum particle size 33 microns) and the portion heated to 150° C. while sparging with nitrogen. 1,1,3,3-tetramethylcyclobutanedione (0.8 part) and 1.46 parts of 1-azido-5,5,7,7-tetramethyloctene-2 (hereinafter referred to as dodecenyl azide) are rapidly added to the second portion of caprolactam. The two portions of caprolactam are quickly mixed, agitated for 10 seconds, and poured into a stainless steel mold (0.7 x 17.5 x 27.5 cm.), heated in an oil bath to 150° C. After 10 minutes the mold is removed from the oil bath and opened. The sheet of polycaprolactam obtained has a density of 0.73 g./cc., a splotched, "applesauce" surface and a moderately-fine cell structure.

B. To compare the results of the control run detailed above with the results of the present invention, the above procedure is repeated substituting a mixture of 0.25 mole percent of 1,1,3,3-tetramethylcyclobutanedione and 0.15 mole percent of a 2/1 adduct of $\epsilon$-caprolactam and 2,4-toluenediisocyanate.

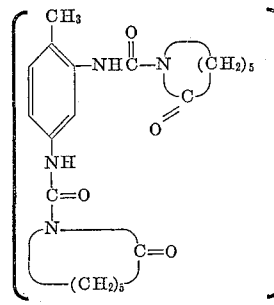

for the 0.4 mole percent of the dione used above.

The resulting foamed sheet has a density of 0.71 g./cc., a smooth, fine-textured surface and a much finer cell structure than the foam sheet of the control.

C. Comparison of the control with another sheet prepared according to the present invention using a different fast cocatalyst than above is accomplished by repeating the control procedure substituting a mixture of 0.25 mol percent of the 1,1,3,3-tetramethylcyclobutanedione with 0.15 mole percent of 1-diphenylcarbamylimidazole for the 0.4 mol percent of the dione used for the control.

The foamed sheet obtained has a density of 0.71 and a much smoother surface than the control. It is also much stiffer while dry than the control.

D. The results obtained using a fast cocatalyst alone are shown by repeating the procedure of 1A substituting 0.40 mole percent of the 2/1 caprolactam-2,4-toluenediisocyanate adduct for the dione cocatalyst of 1A.

The resulting foamed sheet has a density of 0.79 g./cc., a pronounced splotched surface appearance and a non-uniform cell structure. Prominent elongated cells are visible from the top of the sheet to about 3.8 cm. from the top. This section is discarded as waste. By comparison only 2 cm. of the 1B sheet is discarded as scrap.

*Example 2*

This example shows the improved results obtained by using the cocatalyst mixture of this invention for the anionic polymerization of caprolactam over a single cocatalyst.

A. To one portion of dry $\epsilon$-caprolactam (80 parts) is added 0.68 parts of NaH/oil (50/50 by weight) at 80° C. The lactam is agitated with nitrogen while the temperature is being raised to 150° C. Then 4.8 parts of potassium stearate is dissolved in the melt.

To another 80 part portion of $\epsilon$-caprolactam is added 80 parts of the precipitated calcium carbonate described in Example 1, and 0.88 part of 1,4-diazidomethyldurene. The melt is heated to 150° C., 0.85 part of 2,2,4-trimethyl-3-hydroxy-3-pentenoic acid $\beta$-lactone and the first caprolactam portion are added, the mixture sparged with nitrogen for 10 seconds and then poured into the stainless steel mold described in Example 1. Foaming ensues immediately. After 10 minutes the mold is opened. The foamed sheet has a splotched surface, a density of 0.68 g./cc. and a moderately fine cell structure. The waste trim at the top of the sheet is 5½ cm.

B. The procedure of 2A is repeated except that a mixture of 0.3 mole percent of the β-lactone and 0.1 mole percent of the 2/1 adduct of ε-caprolactam and hexamethylenediisocyanate

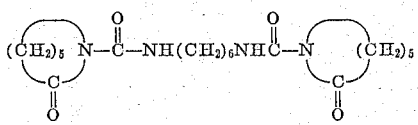

is substituted for the 0.4 mole percent of the β-lactone used as the cocatalyst in 2A. The resulting foamed sheet has a beautiful smooth surface of uniform appearance, a density of 0.72 g./cc. and a cell structure substantially finer than that of the sheet of 2A. The trim loss is reduced to 3.5 cm.

*Example 3*

This example is conducted as the 2B example, but substituting 1.6 parts of 1-azidomethyldurene for the 1,4-diazidomethyl durene and a mixture of 0.15 mole percent of the 2/1 caprolactam-2,4-toluenediisocyanate adduct and 0.25 mole percent of 2,2,4-trimethyl-3-hydroxy-3-pentenoic acid β-lactone for the 0.4 mole of the mixture of 0.3 mole percent of the β-lactone and 0.1 mole percent of the isocyanate adduct used in 2B.

The foamed sheet obtained has a density of 0.9 g./cc., a very smooth surface and a fine cell structure.

*Example 4*

A. To a 40 part portion of dry ε-caprolactam in a cylindrical tube is added 0.34 part of NaH/oil (50/50 by weight). The mixture is sparged with nitrogen while heating to 150° C. Potassium stearate (2.4 parts) is then added and mixed with nitrogen until dissolved. To another 40 part portion of ε-caprolactam is added 0.85 parts of a 2/1 caprolactam 2,6-toluenediisocyanate adduct (see Example 1 for structure) and the mixture is heated to 150° C. Both portions of ε-caprolactam are combined and agitated at 150° C. for 10 seconds. p-Phenoxybenzylazide (0.64 part) is added and the mixture agitated with nitrogen until it starts to become viscous (30 seconds after combination). Nitrogen sparging is stopped. Foaming is complete within 10 seconds and the cylinder of polymer is removed from the cylindrical tube after 10 minutes. The foamed cylinder obtained has a bad surface at the top amounting to 3 cm. out of 14.5 cm. total. The density is 0.6 g./cc. and the cell structure is uneven. A ¼″ wafer is cut from the cylinder and impacted with a steel hammer, compresses without cracking.

B. The procedure of 4A is repeated with the following changes:

(1) The quantity of NaH/oil is raised to 0.51 part.
(2) 1,1,3,3-tetramethylcyclobutanedione (0.5 part) is substituted for the caprolactam/isocyanate adduct as the cocatalyst.
(3) The p-phenoxybenzylazide is introduced 25 seconds after the two portions are combined.

The point of viscosity increase occurs 80 sec. after the two portions are combined. The foamed cylinder has a cell structure similar to 4A and a density of 0.62 g./cc. The bad surface at the top of the cylinder is 1 cm. (out of 15 cm.) A ¼″ wafer is not compressed or cracked by impact with the steel hammer under conditions identical with those used in 4A C. The procedure of 4B is repeated except that a mixture of 0.4 mole percent of the dione and 0.1 mole percent of the caprolactam/isocyanate adduct of 4A is substituted for the 0.5 part of the dione used as the cocatalyst in 4B. The point of viscosity increase is at 45 seconds after the portions are combined.

The foamed cylinder has a density of 0.47 g./cc. It has no bad surface at the top. A ¼″ wafer cut from the cylinder withstands more than 12 severe hammer blows without cracking.

*Example 5*

A. The procedure of Example 1A (1,1,3,3-tetramethylcyclobutanedione as the sole cocatalyst) is repeated with the exception that 0.68 parts of NaH/oil is used instead of 1.02 parts.

B. The procedure of 1B (cocatalyst mixture) is repeated except that the amount of NaH/oil is reduced from 1.02 parts to 0.68 part.

The sheets formed by the 5A and 5B procedures are conditioned by boiling in a 55.5% potassium acetate solution and the physical properties measured with the following results.

| Sheet | Izod Impact Unnotched, ft./lb./in. | Tensile Strength (p.s.i.) | Ultimate Elongation, Percent | Secant Modulus at 2% Strain (p.s.i.) |
|---|---|---|---|---|
| 5A | 0.95 | 900 | 8.9 | 69,000 |
| 5B | 1.32 | 1,160 | 11.3 | 106,000 |

The Izod impact is run according to ASTM D256–54T, the tensile strength, elongation, and secant modulus by ASTM D638–52T.

In addition to the superior physical properties obtained when the cocatalyst mixture of this invention is used, the cell structure and surface of the sheet 5B are much better than those of sheet 5A.

*Example 6*

To a 40 part portion of dry ε-caprolactam is added 0.51 part of NaH/oil (50/50 by weight) at 80° C. in a cylindrical container. The melt is sparged with nitrogen and heated to 150° C. Potassium stearate (2.4 parts) is dissolved in the melt at this point. To a second 40 part portion of ε-caprolactam at 175° C. is added 0.087 part of $(CF_2S)_x$ polymer wherein $x$ is 5000. The melt is held at 175° C. for 20 minutes with nitrogen agitation and then cooled to 150° C. 1,1,3,3-tetramethylcyclobutanedione (0.25 part) is added to the the second portion of caprolactam and the two lactam portions are mixed and agitated for 15 sec. with nitrogen, then 0.64 part of dodecenyl azide is added and sparging with nitrogen is continued for 55 sec., then stopped. After 10 minutes following portion combination in the oil bath at 150° C., the foamed cylinder obtained is removed from the mold. It has a density of 0.54 g./cc. and a moderately fine cell structure. It is also quite tough.

*Example 7*

To a 40 part portion of ε-caprolactam is added at 80° C. 0.34 part of NaH/oil (50/50 by weight), nitrogen sparging is started and the melt is heated to 150° C. Potassium stearate (2.4 parts) is added and mixed in well. To another 40 part portion of caprolactam is added 0.78 part of an adduct of polymethylene polyphenylisocyanate having an average isocyanate content per mole of 3 and ε-caprolactam. This isocyanate is sold under the trade name "PAPI." The melt is heated to 150° C. with nitrogen agitation and 0.25 part of 2,2,4-trimethyl-3-hydroxy-3-pentenoic acid β-lactone is added. The two lactam portions are combined and sparged with nitrogen for 15 seconds. Dodecenyl azide (0.64 part) is then added and the melt sparged with nitrogen at 150° C. for 43 seconds after combination of the portions. Ten minutes following combination the foamed cylinder is removed from the mold. It has a density of 0.53 g./cc., has a uniform, fine cell structure, and is very tough.

Example 8

The procedure of Example 7 is repeated with the following changes:

(1) sebacoyl biscaprolactam (0.1 mole percent based on the caprolactam polymerized) is substituted for the "PAPI"-lactam adduct.

(2) The dodecenyl azide is added 25 second following the combination of the two portions of lactam. The foamed cylinder has a density of 0.53 g./cc. and is very tough.

Example 9

The procedure of Example 1B (1,1,3,3-tetramethylcyclobutanedione/isocyanate - lactam adduct cocatalyst mixture) is repeated with the following changes:

(1) Diphenylcarbonate (0.30 part) is substituted for the isocyanate-lactam adduct.

(2) The quantity of dione is reduced to 0.6 part.

The foamed sheet thus obtained has a density of 0.70 g./cc., an attractive surface and a fine, uniform cell structure.

Example 10

The procedure of Example 9 is repeated substituting poly[2,2-propanebis(4-phenyl carbonate)] having a degree of polymerization of about 160 (0.36 part) for the diphenyl carbonate. The foamed sheet obtained has a fine, uniform cell structure, an attractive surface and a density of 0.72 g./cc.

I claim:

1. In the process for making foamed polycaprolactam which comprises heating a mixture of ε-caprolactam and at least one allylic azide blowing agent selected from the group consisting of 8 to 24 carbon atom aliphatic allylic azides and benzyl azides in the presence of a lactam-base salt catalyst and a cocatalyst, the improvement which comprises adding a cocatalyst mixture of (a) at least one of the group consisting of 1,1,3,3-tetramethylcyclobutanedione and 2,2,4-trimethyl-3-hydroxy-3-pentenoic acid β-lactone, and (b) at least one fast cocatalyst having a no-flow time of less than about 1.5 minutes.

2. A process of claim 1 wherein said fast cocatalyst comprises an acyl lactam bearing at least two lactam rings.

3. A process of claim 1 wherein said fast cocatalyst comprises a compound of the formula

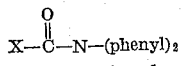

wherein X is a heterocyclic ring having two conjugated double bonds and at least two ring nitrogen atoms, one of which is bonded to said

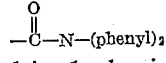

4. A process of claim 1 wherein said fast cocatalyst comprises an organic carbonate having at least one carbocyclic aromatic group bonded through aromatic carbon to an oxygen of a carbonate group.

5. A process of claim 1 wherein the fast cocatalyst comprises a polymer of the formula—$(CF_2S)_x$—wherein $x$ is about from 3000 to 6000.

6. A process for making foamed polycaprolactam which comprises heating a mixture of ε-caprolactam and at least one allylic azide blowing agent selected from the group consisting of 8 to 24 carbon atom aliphatic allylic azides and benzyl azides at a temperature of at least about 130° C. but below that at which polycaprolactam melts in the presence of a base and adding a cocatalyst comprising a mixture of (a) about from 0.2 to 0.5 mole percent based on the total caprolactam used of cocatalyst selected from at least one of the group consisting of 1,1,3,3-tetramethylcyclobutanedione and 2,2,4-trimethyl-3-hydroxy-3-pentenoic acid β-lactone, and (b) about from 0.05 to 0.2 mole percent based on the total caprolactam used of fast cocatalyst having a no-flow time of less than about 1.5 minutes selected from at least one of the group consisting of acyl lactams bearing at least two lactam rings; compounds of the formula

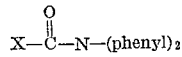

wherein X is a heterocyclic ring having two conjugated double bonds and at least two ring nitrogen atoms, one of which is bonded to said

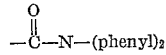

organic carbonates having at least one carbocyclic aromatic group bonded through aromatic carbon to an oxygen of a carbonate group; and polymers of the formula—$(CF_2S)_x$—wherein $x$ is about from 3000 to 6000.

7. A process of claim 6 wherein said fast cocatalyst comprises the 2/1 adduct of ε-caprolactam with 2,4-toluenediisocyanate.

8. A process of claim 6 wherein said fast cocatalyst comprises diphenylcarbamylimidazole.

9. A process of claim 6 wherein said fast cocatalyst comprises poly[2,2-propane-bis(phenyl carbonate)].

10. A process of claim 6 wherein said fast cocatalyst comprises diphenyl carbonate.

11. A process of claim 6 wherein said base is a sodium hydride-lactam salt.

12. A process of claim 11 wherein the allylic azide foaming agent is 1-azido-5,5,7,7-tetramethyloctene-2.

13. A process of claim 11 wherein the allylic azide foaming agent is 1,4-bis(azidomethyl)durene.

No references cited.

MURRAY TILLMAN, *Primary Examiner.*